Figure 7:
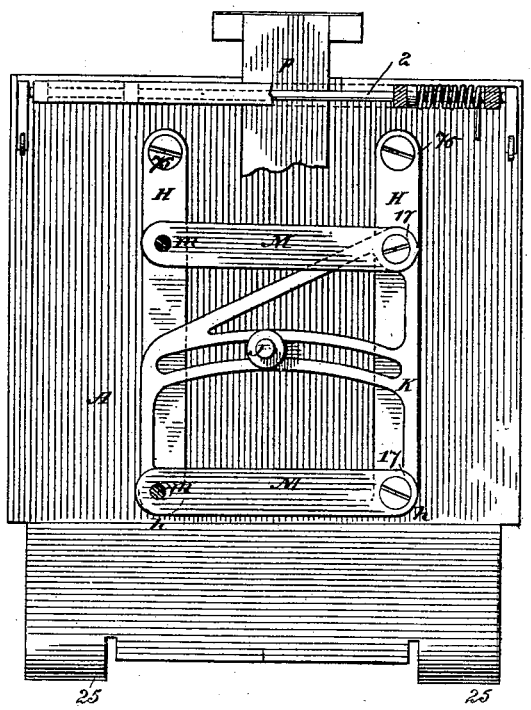

(No Model.)  5 Sheets—Sheet 1.
T. HALL.
Type Writer.
No. 238,387.  Patented March 1, 1881.
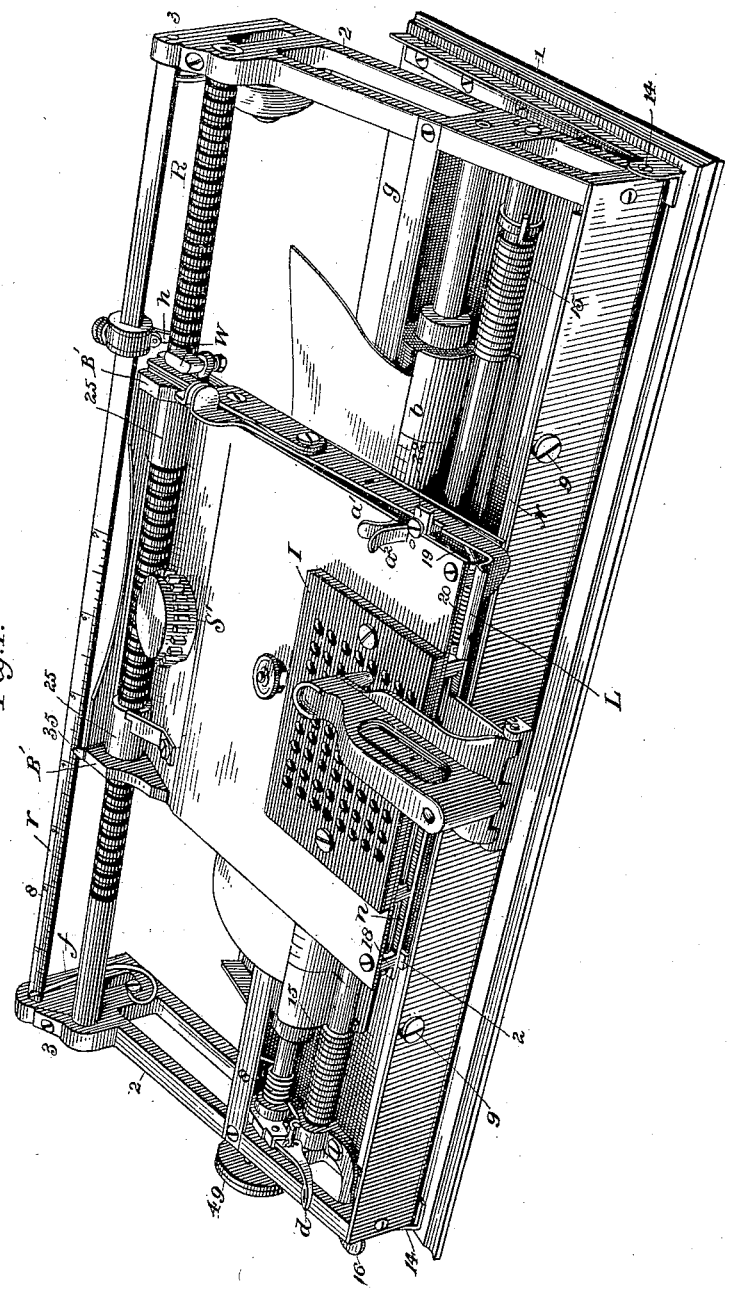
Attest:
R. F. Barnes.
[signature]
Inventor:
Thomas Hall
by Ellis Spear
Attorney.

(No Model.) 5 Sheets—Sheet 2.
T. HALL.
Type Writer.
No. 238,387. Patented March 1, 1881.
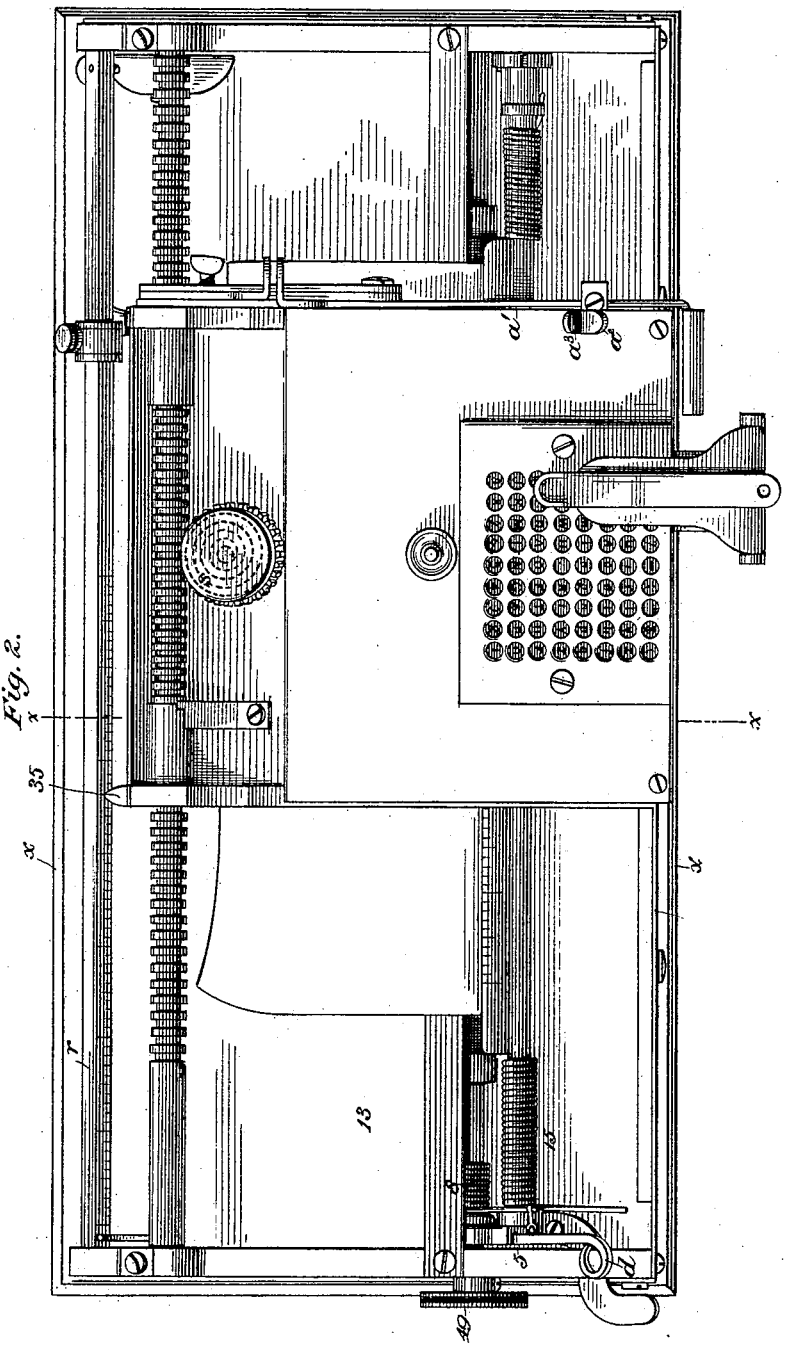
Attest:
R. H. Barnes.
S. W. Surry
Inventor:
Thomas Hall
by Eli Spear
Attorney

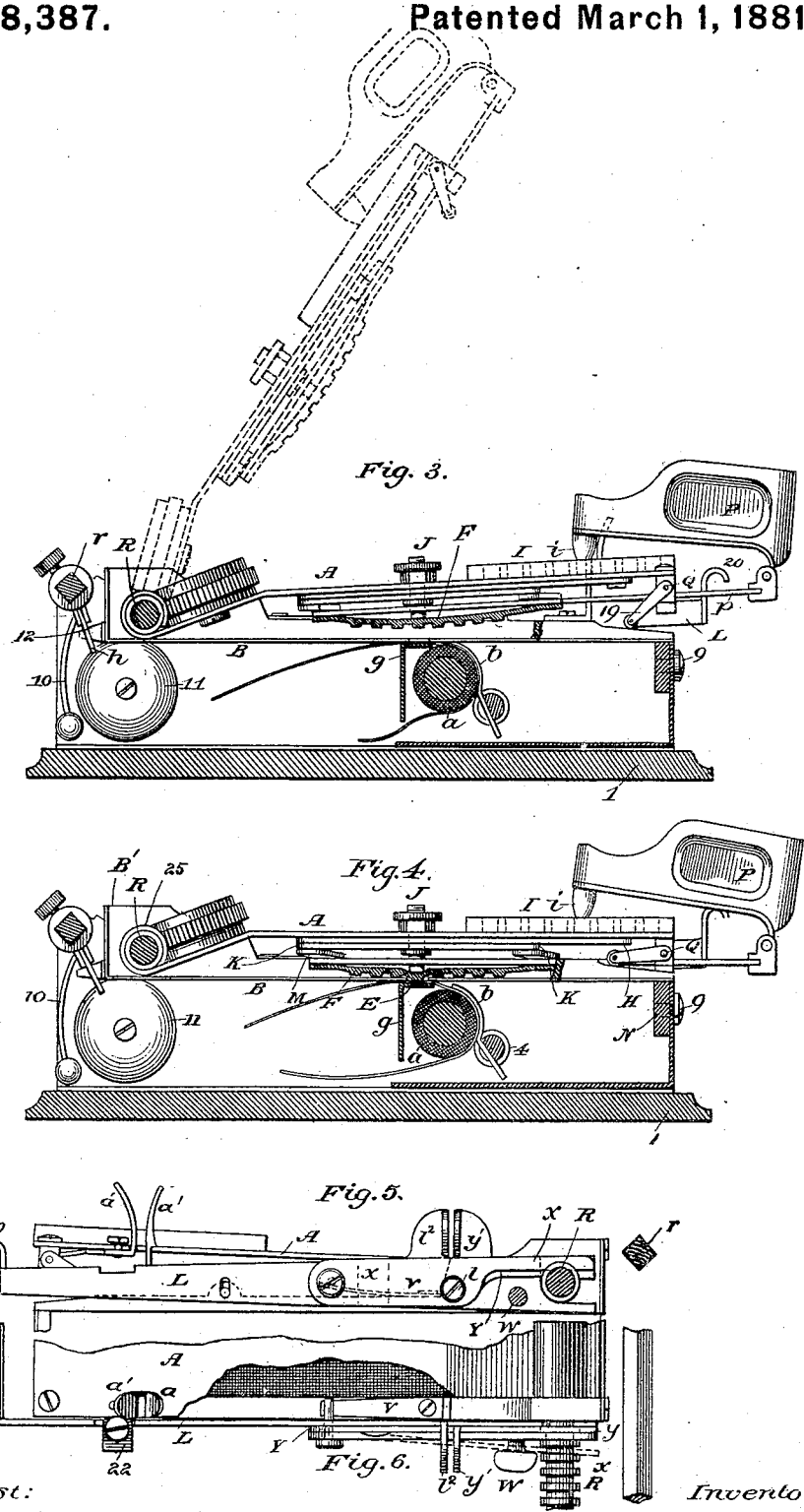

(No Model.) 5 Sheets—Sheet 4.

T. HALL.
Type Writer.

No. 238,387. Patented March 1, 1881.

Attest:
R. H. Barnes.
S. W. Sully

Inventor:
Thomas Hall
by Ellis Spear
Attorney.

N. PETERS, PHOTO-LITHOGRAPHER, WASHINGTON, D. C.

(No Model.)   T. HALL.   5 Sheets—Sheet 5.
Type Writer.

No. 238,387.   Patented March 1, 1881.

Attest:
R. F. Barnes
S. W. Savy

Inventor:
Thomas Hall,
by Ellis Spear
Attorney.

UNITED STATES PATENT OFFICE.

THOMAS HALL, OF BROOKLYN, NEW YORK.

TYPE-WRITER.

SPECIFICATION forming part of Letters Patent No. 238,387, dated March 1, 1881.

Application filed December 1, 1880. (No model.)

*To all whom it may concern:*

Be it known that I, THOMAS HALL, of Brooklyn, in the county of Kings and State of New York, have invented a new and useful Improvement in Type-Writers; and I do hereby declare that the following is a full, clear, and exact description of the same.

My invention relates to type-writers of that class in which the type are carried on a plate made movable so as to bring any required letter into alignment with any desired point upon the paper.

The object of my invention is to simplify the structure and reduce the number of parts in type-writing machines; to reduce the size and cost, as well as to render the machine durable and serviceable.

It consists, primarily, of a movable type-form impelled by means of suitable mechanism over an inking-plate to bring any given letter opposite a hole in said plate, whereby the type may be pressed through said opening and upon the paper beneath.

It consists, further, in the combination of a bed-plate, bar, or roller for sustaining the paper while printing, with an inking-plate, or plate provided with an inking-pad arranged directly over it and provided with an opening for the admission of one of the types; with a type-form in which the separate types are adapted to be depressed independently; and with a plunger directly above the opening in the inking-plate, whereby any given letter of the type-form is brought into proper position and pressed upon the paper.

It also consists in making the type-form flexible, whereby any type may be forced through the opening and printing effected without complication of parts.

It finally consists in important details of construction for carrying into effect these leading features of my invention, all of which details are fully set forth hereinafter and specifically pointed out in the claims.

The general plan of this machine includes a base or platen, on which the paper rests in order to be printed. This may be a plate, bar, or roller. Over this the paper is fed, either in sheets or from a roll, with a regulated intermittent motion, to form the lines of writing. This base or platen and the feed-rollers mentioned are a part of the base of the machine.

The type-form is movable, both for bringing any given letter into alignment with the opening in the moving plate on which it is carried, and also in order to bring the opening in said plate from the position of one letter to that of the next. The motion required to bring any given letter into alignment with the opening in the plate is directly imparted by movement of the hand grasping a small lever or arm and guiding the same by means of a pointer thereon fitting definitely-arranged holes, any one of which, when the pointer is set there, brings its appropriate letter over the opening, through which it is pressed to print the letter. Further, the motion of this directing-arm is accompanied or directly followed by a depression of the type-form and its supporting-frame and subsequent elevation, these movements being necessary in the act of printing a letter. These movements are made to operate an escapement, whereby the perforated plate which carries the type-form is permitted to move one notch to the right, bringing the type to the space on the paper appropriate for the next letter.

The step-by-step movement of the type-carrying mechanism from left to right to form the necessary spacing is accomplished by means of a spring or equivalent motor acting in connection with an escapement. This escapement is of special construction, and consists of an elastic arm, which engages with a rack-bar, and is released by the movement necessary in printing, but advances a limited distance in the direction of the movement of the carriage before again engaging with said rack-bar. After its advance and engagement the carriage is moved up to it as to a stop the distance of its advance, and this distance may be varied to vary the spacing.

In the following more specific description the accompanying drawings are referred to, in which—

Figure 8:
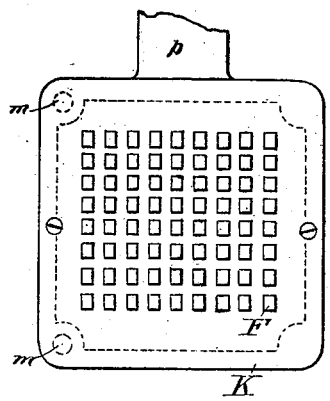
Figure 9:
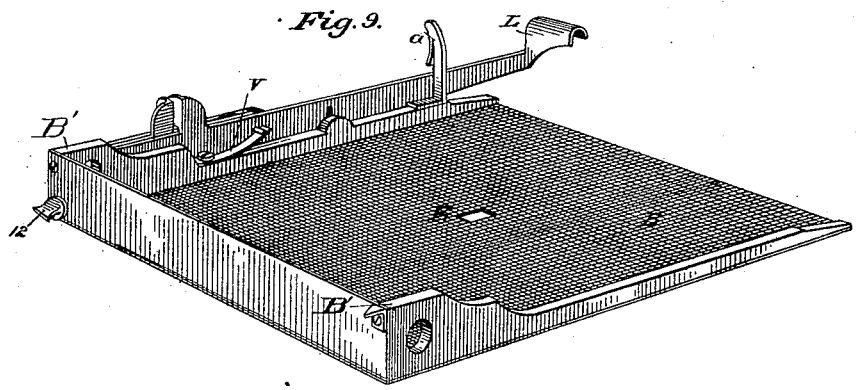
Figure 10:
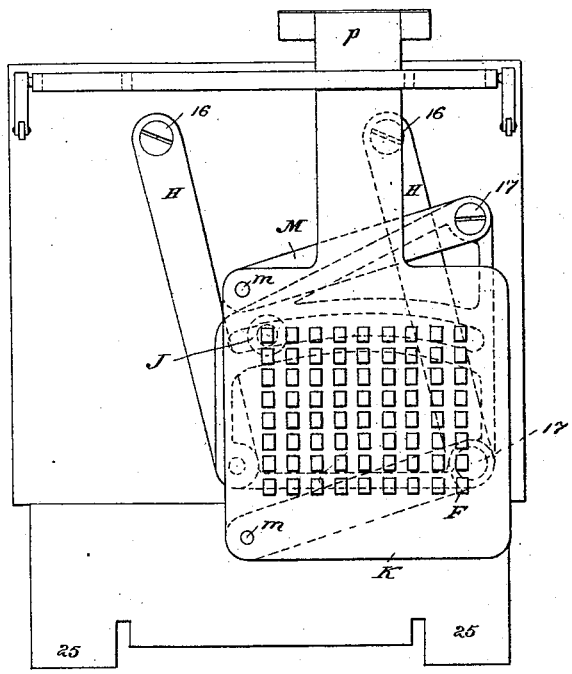
Figure 11:
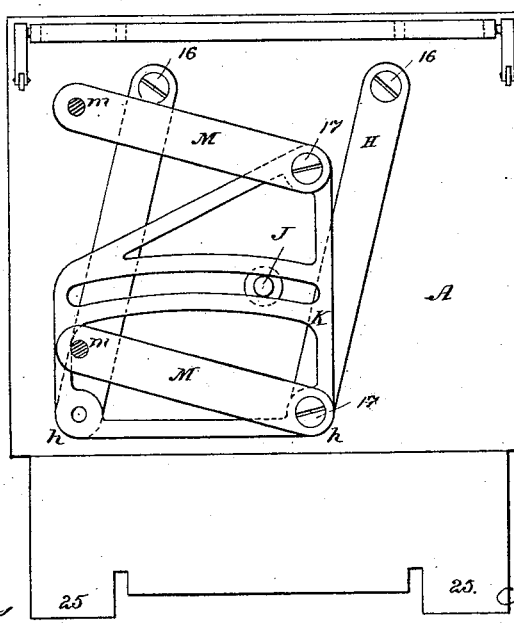

Figure 1 is a perspective view of my typewriter, showing the top in position for work. Fig. 2 is a plan view of the same. Figs. 3 and 4 are sections on line $x$ $x$, Fig. 2, the latter, Fig. 4, showing the type in the act of printing. Fig. 5 is a side elevation, and Fig. 6 a plan view, of the escapement or spacing mechanism. Fig. 7 is a view of the under side of the plate carrying the type-plate, and shows the link mechanism. Fig. 8 is a detached view of the type-plate. Fig. 9 represents the inking-plate and attachments. Figs. 10 and 11 are bottom views, illustrating different positions of the type-form and its actuating mechanism.

In these drawings the base of the machine is represented at 1. It is rectangular in plan, and may be about fourteen inches wide and seven inches from front to rear, though these dimensions may be enlarged or reduced, if found necessary for any special purpose. On the front of this is hinged a frame, the sides 2 2 of which are slightly raised in the rear, as shown at 3 3, and support a rack-rod, R, the ends of which are fixed in the said sides. This rod is made round for purposes hereinafter explained, and is provided with grooves running around it, to correspond with the notches or teeth in an ordinary rack-bar. Upon it is hinged the plate A, which carries the type-form F and other parts auxiliary thereto. Across this frame and supported in the sides thereof is placed the platen or bar $g$, on which the paper rests when impressed by the type. The form of this is shown in Fig. 1, and in section in Fig. 3. It may be greatly changed without departing materially from the general plan of my machine. It may be made instead in the form of a roller, the bearings of which may be in the sides to which the bar is fixed, or the paper may be held on a flat table and the machine operated on it in the same manner that it does when the paper is on the bar $g$. In front of this bar is a roller, $a$, having its bearings in the sides, and over this the paper is moved to the bar or platen $g$. The shaft of this roller is provided at the left-hand end with a pulley, 5, and lever $d$, the said lever being adapted to give partial rotation to the roller, for moving the paper from line to line, in the same manner as is ordinarily done in machines of this class. This wheel 5 may be smooth, and the end of the lever, which is pivoted in the collar, is placed so as to pinch upon the surface, or the wheel may be notched. The weight of the lever or force of the spring 8 will throw it out of contact, and the roller may then be turned freely backward by means of the milled head 49. Obviously the paper to be printed may be wound around this roll, or may be passed around it from below, and extended above and over the bar $g$. I have shown the latter and preferred form. Upward movement of the lever $d$ a limited distance will give a regulated amount of movement to the roller $a$, and thus advance the paper over the bar $g$. The movement of the lever $d$ may be limited by any convenient stop, made adjustable, so that the amount of motion of the roller can be varied and the width of the space between the lines enlarged or diminished.

Over the roller $a$, on the front thereof, is a spring plate or clip, $b$, of substantially the same curve as the roller, and adapted to press against its surface. This plate or clip is mounted on a shaft, 4, the bearings of which are in the sides of the machine, said shaft being provided with springs 15. The spring holds the clip tightly against the paper on the roller $a$, and the lever 16, fixed upon the shaft 4, when depressed, turns said shaft and lifts the clip from the paper. The lever, of course, acts in opposition to the spring. The object of this clip is to hold the paper firmly in place, while it yields sufficiently to allow the paper to be fed by the turning of the roller. The clip is lifted to permit the end of the paper, sheet, or roll to be entered.

As shown in Fig. 1, the upper exposed surface of the clip is marked with a graduated scale, and is so constructed and arranged that the edge serves as a cutter to separate the paper by tearing it against the edge. A similar scale is on the bar $r$, with the marks opposite those on the clip. These correspond to the spacing on the rod R, hereinbefore more fully explained, and serve to indicate the position of the printing mechanism upon the paper.

On the front plate of the frame of the machine is a bar, N, adjustable vertically and held by set-screws 9 9. The hinged plate B, and indirectly that carrying the printing mechanism, rest upon this bar, and by said bar the position of this mechanism in relation to the paper on the bar $g$ is accurately adjusted.

On the rear of the machine, behind and a little above the rod R, is the bar $r$, heretofore referred to. It is preferably square, but has cylindrical ends, which rest in bearings in the sides of the machine, in which it may turn. At the right-hand end it is provided with a bell-hammer, 10, fixed upon it, and adapted, when properly moved, to strike a bell, 11, on the inside of the frame. On bar $r$ is a trigger, $h$, adjustable, and held at any desired point by a set-screw. It is adapted to be struck by a stud, 12, on the carriage, as will be explained, and when so struck is thrown backward and instantly released. A spring, $f$, on the other end of $r$, returns the bar by rotary motion and causes the hammer to strike the bell, serving thus to indicate when the printing has approached near the end of the line.

It will be observed that the construction of the frame and base of the machine, as hereinbefore described, gives ample space for the paper. The sheets, if separate sheets be used, may be introduced either from front or rear, and may extend backward under the rod R as far as necessary; or a roll of paper may be placed in the rear of the bar $g$ and be fed up and over said bar.

The whole frame of the fixed part of the machine rests upon a board or plate, 1, as a basis, and is pivoted at the forward edge, as shown at 14, Fig. 1. By this it may be set to any desired inclination.

I proceed now to the description of the movable part of my apparatus and the mechanism more directly connected with the printing.

Upon the rod R is hinged a plate, B, by means of two side pieces, B' B', to which it is attached. These side pieces are perforated, so that the rod R passes directly through their rear ends. The plate B rests at its forward edge upon the bar N, as heretofore explained, in such a manner that the lower surface of the plate B shall come nearly in contact with the upper surface of the bar $g$. The plate B has an opening, E, preferably rectangular, near the center of the plate, and directly over the bar $g$. Above the plate B is another plate, A, also hinged upon the rod R by means of sleeves 25 25, arranged within the side pieces B' B', so that either the upper plate, A, alone, or both A and B together, may be turned upward and backward to rest upon the bar $r$.

Underneath the plate A is the printing-form F. This consists of a rubber plate, having the type upon its lower surface. It is preferably square in shape, and the type are arranged in parallel lines in any convenient manner, having relation to the frequency of their use.

The manner of connecting the type-form to the plate A so as to give all the necessary movements thereon, and to permit the stud on plate A to press any given letter of said form through the opening in plate B and upon the paper below, may be described in connection with Figs. 7 and 8, though further illustration is given in Figs. 3 and 4.

Referring more particularly to Fig. 8, the type-form F will be seen fixed to a frame, K', which serves to give it direct support. The frame is cut out from a plate. Its form is shown on the outside in full, on the inside in dotted lines. The rubber type-form is fully exposed in the lettered part. The frame K' is pivoted on the links M M at $m\ m$, the other ends of these links being pivoted to a frame, K' at 17 17. Direct movement of the type-form to the front of the machine, as by drawing upon the bar $f$, will swing the links on pivots 17 17 to the front, the type-plate, by reason of its pivotal connection at $m\ m$, keeping its sides always parallel with the edge of the plate A. The frame K is pivoted to the links H H at $h\ h$, said links H H being pivoted directly to the plate A at 76 76. Lateral movement, therefore, of the type-form swings the links M M, the frame K, and the links H H, the form-frame K' turning on pins $m\ m$, the links M M on pins 17 17, and the frame K on $h\ h$, the form and the frame preserving the parallelism of their sides. The printing-stud J is fixed in the plate, and moves only vertically with the plate. It passes through the slot in the frame K, which slot is made on a radius equal to the length of links H. As the links H swing to the right or left they shift the frame K laterally, and also move it forward, more or less, depending on the amount of lateral deflection, and as the frame moves the stud J travels in the slot. The small collar on the stud (shown in Figs. 3, 4, and 7) holds the frame, and in connection with the pivots 76 76 secures the whole link movement and the type-form to the plate A.

It will be understood that either forward and backward or right and left hand motion, or any resultant of these, can be given to the type-form by means of the mechanism above described, in order to bring any given letter to register with the stud J and the hole E in the plate B.

Movements necessary to bring any one of these letters thus to register with the stud J are made and determined by means of a plate, I, and arm P. The arm P is hinged upon the front end of the flat bar $p$, projecting a little in front of the plate A. The arm P may, therefore, be moved up and down on its hinge in relation to the bar $p$, or by it. The bar $p$, and thereby the type-form, may be drawn out to the front, or pushed back to the rear, or moved from side to side. The plate I has holes provided with letters and figures exactly corresponding in number and position to the letters and figures upon the type-form, these letters and figures being placed so as to be visible at the bottom of the holes each in its proper place. A spur, $i$, upon the end of P, is adapted to fit into the holes, the upper edges of the holes and the end of the spur being rounded, so that the spur will slip easily into place. The arm P is accurately hinged upon $p$, so as to be capable only of vertical motion thereon. It is adapted to be grasped between the thumb and fingers, and the construction and arrangement of the parts is such that when the spur $i$ is set in the hole marked by any given letter, that letter on the type-form is brought directly under the stud J and over the hole in the plate B.

It will be understood that pressure may be applied by the hand while grasping the arm P, so as to depress the plate A, and with it the stud which forces the type upon paper. The plate A is raised by devices elsewhere referred to, consisting of the shaft 2 and arms 19, which arms are forced downward by the spring upon the shaft. The flat bar $p$ slides freely between a rod, Q, and a bar, $n$, the latter being connected to the plate A by short offsets 18. The rod Q passes through these offsets and turns therein. At its ends it is provided with arms 19, bent at right angles to the rod, and bearing upon the sides B' of the lower plate. A coiled spring, 20, on the rod Q throws these arms downward, thus tending to separate the forward ends of plates A and B; but the springs yield readily to pressure and allow the plate A, when pressed, to approach the plate B, thus pressing the stud J upon the letter of the type-form directly underneath it, and causing said letter to project through the plate B upon the paper, which rests upon the bar $g$ below. The upper plate, A, is connected to the lower, B, by means of a spring-catch, $a'$, on the right-hand side of the machine. A thumb-piece, $a^2$, is fixed upon the plate A, on the edge of the hole $a^3$, through which the catch $a'$ projects. By this thumb-piece the catch is easily detached and the plate lifted. Sufficient play is allowed by the catch for the necessary vertical movement of the plate A.

It will be obvious, from the description already given, that all the movements, both the horizontal of the type-form and the vertical of the plate A, to which the type-form is attached, are effected by means of the arm P, the horizontal motions of the arm, as it is moved to any given hole in the plate I, regulating the position of the type, and the downward pressure of the same arm as it is thrust into the hole pressing down the plate A against the spring-arms 19, and pressing the stud J against the type, as heretofore described. The lateral movement of the whole structure by which the types are carried is effected by means of the coiled spring S within the barrel S', and is regulated by the escapement attached to the right-hand side of the movable plates. The spring S is attached to the plate A by means of a stud, $s$, which serves also as a pivot for the barrel S'. The barrel has a cog-gear on its periphery, which engages with the teeth upon the rod R, which is, for the greater part of its length, a cylindrical rackbar, and it permits the teeth to remain in engagement, whatever the position of the plate A. The spring is so arranged, being connected at one end to the stud and at the other to the inner surface of the barrel, that when the plates A and B are pushed to the left on the rod R the spring is wound up, and its reaction tends to force the plates constantly from the left to the right. The escapement referred to heretofore upon the right-hand side of the machine gives this motion imparted to the spring proper regulation.

The spacing or escapement mechanism consists of a lever, L, (represented in Figs. 1, 5, 6, and 9,) which works on a pivot at $l$. The short end engages with the under side of the rack upon the rod R, and forms part of the escapement. A spring, V, throws the long or forward end of the lever L up and the short or rear end down out of the notch in the rack. The screw $l$ is also the fulcrum of a short lever, Y, which is connected to L by a screw in front of the pivot, and on which is fixed a spring-arm, X, attached thereto at the forward end. The spring X, when not compressed, stands off a little distance from the lever Y, and when it is down engages with the teeth upon the rod R. On a stud fixed to the lever Y is a stop, W, which limits the lateral movement of the spring X. The stop is pivoted in the stud, and one face is cut away more than the other, so that when turned with one side to the spring X movement of the spring over one notch is permitted, and when the other side is turned movement of two notches.

It will be understood that the lever Y does not engage with the rack, and that the spring S is brought into engagement with the rack on the upper side the instant the lever L is disengaged below.

It will thus be seen that when the forward end of the lever Y is depressed the spring X is lifted out of the notch and springs laterally to the right over one or two notches, as the case may be. When pressure is removed from the lever L the spring V throws the rear end down, thus throwing the lower lever, L, out of gear and the spring into gear, when the pressure of the spring S, which must always be greater than the resistance offered by the spring X, moves the plates one or two notches to the right, according to the motion permitted to the spring X. Thumb-pieces $l^2 y'$, the former fixed to the lever L and the latter to the lever Y, afford means by which the escapement may be released from the rod R, and all this part of the apparatus moved to the left. This is effected by grasping the pieces $l^2 y'$ between the thumb and the fingers and pressing them together, and then forcing the plates to the left. Other mechanism may be used to regulate the distance of movement of the spring. Motion is imparted to the lever L, either directly by the application of the hand or finger-piece 20, or, by the depression of the plate A, a small stud, 22, which strikes upon the lever and depresses it with the depression of the said plate. Upon the rear end of the right-hand side piece of the plate A is a beveled stud, 12, which strikes the spur upon the arm R and rings the bell, as heretofore explained. The lower end of the spur $h$ is hinged, as shown at 24, to permit the free movement of the stud in the opposite direction. On the left-hand side piece of the plate B is a pointer, 35, which serves to indicate upon the graduated side of the bar R the position of the printing mechanism.

It will thus be seen that the spacing operation is automatically accomplished by the movement of the arm which carries the pointer and which effects the printing, and that the whole is done simultaneously. The printing may be at any time seen by lifting the plate B, and the inside mechanism may be at any time examined by loosening the catch between A and B and raising the plate A.

Having thus described my invention, what I claim is—

1. In a type-writing machine, a plate, A, adapted to move intermittently, a type-form attached thereto and movable to bring any given letter into alignment, and mechanism, substantially as described, for moving said plate and type-form, substantially as described.

2. In a type-writing machine, an elastic type-form, in combination with a plate having an opening therein, said form being movable to bring any given letter into alignment with the opening, and permitting any given letter to be pressed by a suitable plunger upon the paper through the openings.

3. The combination of the movable type-form, the plate having opening therein, the ink-cushion, and mechanism for pressing the type upon the ink-cushion and paper, substantially as described.

4. The combination of the elastic type-form, the plate having an opening therein, and the stud J.

5. A vertically-movable plate, A, provided with an index-plate upon its upper surface, in combination with a type-form attached to its under side and movable thereon to bring any given letter into alignment, mechanism for moving said type-form and for directing said movement in connection with said index-plate, and means, substantially as described, for pressing the type upon the paper by the depression of said plate.

6. The hinged plate A, carrying stud J, having a movable type-form carried upon its under surface and an index-plate upon its upper, in combination with an arm, P, connected to said type-form, and adapted, by means substantially as described, in connection with the index-plate, to bring any given letter into alignment, and also adapted to depress said plate A and force the type upon the paper, substantially as described.

7. In combination with the type-form and with the plate A, the link mechanism H H and M M and the intermediate frame, K, substantially as described.

8. The combination of the plates A and B on the rod R, and adapted to slide thereon, said plates carrying the printing mechanism, and operating substantially as described.

9. The combination of plates A and B, the upper carrying the movable type-form, and having a spring between said plates, substantially as described.

10. The combination of the independently-hinged plates A and B, rod R, and spacing mechanism, operated by the movement of the upper plate, substantially as described.

11. In combination, the rod R, having a cylindrical surface and teeth, as described, the plate A, hinged thereon, and the barrel pivoted on said plate, and provided with a spring, the said barrel having cogs to mesh with the teeth upon the rod, whereby vertical motion is permitted to said plate without interfering with the action of the spring, substantially as described.

12. The combination of the adjustable bar N of the plate B and the bar g, substantially as described.

13. The combination of the levers L and Y, and the spring X with its adjustable stop, substantially as described.

14. The combination of a movable flexible type-form, the hinged perforated plate B, the bar g, roller a, and spring-clip b, said roller and clip being arranged in front of the bar g, whereby the plate B may be lifted and the paper removed, substantially as described.

15. In a type-writer, an elastic type-plate, in combination with a platen and with means for bringing the letters on said plate into alignment, and means for pressing said letters upon the paper, substantially as described.

16. An elastic type-form, in combination with a rigid frame fixed to the edge of said type-form, and adapted, by means substantially as described, to be used in connection with the moving mechanism and a perforated inking-plate of the type-writer, substantially as described.

17. The combination, with the feed-roller a, of the clip b, pivoted independently of the roller, and adapted to press upon it to hold the paper, and also adapted to be raised from the roller to admit the paper, substantially as described.

In testimony whereof I have signed my name to this specification in the presence of two subscribing witnesses.

THOS. HALL.

Witnesses:
E. L. HUTCHINSON,
T. M. FOOTE.